United States Patent [19]
Takahashi et al.

[11] 4,350,893
[45] Sep. 21, 1982

[54] RADIATION IMAGE STORAGE PANEL

[75] Inventors: Kenji Takahashi; Junji Miyahara, both of Minami-Ashigara, Japan

[73] Assignee: Fuji Photo Film Co., Ltd., Kanagawa, Japan

[21] Appl. No.: 144,656

[22] Filed: Apr. 28, 1980

[30] Foreign Application Priority Data

May 1, 1979 [JP] Japan ................................. 54-53631

[51] Int. Cl.³ ........................................... H05B 33/00
[52] U.S. Cl. ............................... 250/484.1; 250/337; 250/483.1
[58] Field of Search ............... 250/483, 486, 337, 484

[56] References Cited
U.S. PATENT DOCUMENTS

| 2,243,828 | 5/1941 | Leverenz | 250/483 |
| 3,859,527 | 1/1975 | Luckey | 250/337 |
| 3,975,637 | 8/1976 | Ikedo et al. | 250/337 |
| 4,149,083 | 4/1979 | Suys et al. | 250/486 |
| 4,239,968 | 12/1980 | Kotera et al. | 250/484 |
| 4,259,588 | 3/1981 | Luckey et al. | 250/483 |

Primary Examiner—Harold A. Dixon
Attorney, Agent, or Firm—Gerald J. Ferguson, Jr.; Joseph J. Baker

[57] ABSTRACT

A radiation image storage panel having a fluorescent layer which comprises a binder and a stimulable phosphor dispersed therein. The fluorescent layer further contains a white powder dispersed therein in an amount of 0.01 to 1 parts by weight per one part by weight of the stimulable phosphor. The panel provides an image of high sharpness.

13 Claims, 1 Drawing Figure

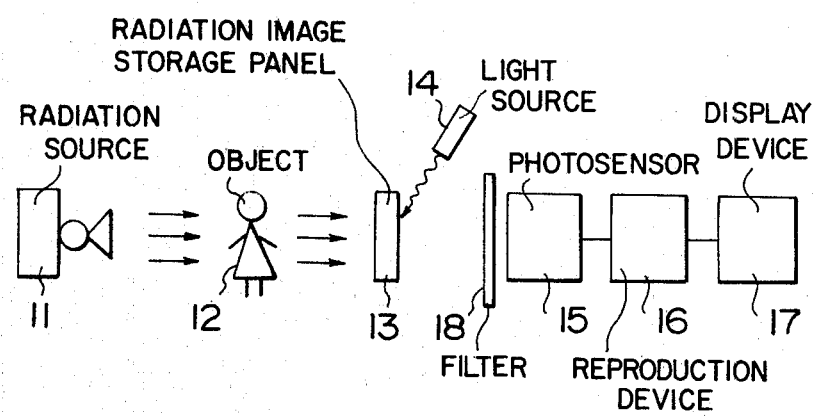

RADIATION IMAGE STORAGE PANEL

BACKGROUND OF THE INVENTION

1. Field of the Invention

This invention relates to a radiation image storage panel using a stimulable phosphor, and more particularly to a radiation image storage panel which provides an image of high sharpness.

2. Description of the Prior Art

As is well known in the art, a photographic method using a silver salt such as radiography has generally been employed to obtain a radiation image. Recently, from the viewpoint of problems as shortage of silver resources, a method of obtaining a radiation image without using a silver salt has been desired.

An example of such a method is disclosed in U.S. Pat. No. 3,859,527. In the method of the patent, is used a radiation image storage panel comprising a stimulable phosphor which emits light when stimulated by an electromagnetic wave selected from visible light and infrared rays after exposure to a radiation (The term "radiation" as used herein means an electromagnetic wave or a corpuscular radiation such as X-rays, $\alpha$-rays, $\beta$-rays, $\gamma$-rays, high-energy neutron rays, cathode rays, vacuum ultraviolet rays, ultraviolet rays, or the like.). The method comprises the steps of (i) causing the stimulable phosphor of the panel to absorb a radiation passing through an object, (ii) scanning the panel with an electromagnetic wave such as visible light or infrared rays (hereinafter referred to as "stimulating rays") to sequentially release the radiation energy stored in the panel as instantaneous light emission, and (iii) electrically converting the emitted light to an image.

By the way, it is well known in the art that in the conventional radiography in which an intensifying screen is used in combination with a film, the sharpness of the image obtained depends upon the degree of spread of the instantaneous light emitted by the phosphor in the intensifying screen. In contrast to this, in the above-mentioned method for recording and reproducing a radiation image utilizing the stimulability of a stimulable phosphor, the sharpness of the image obtained does not depend upon the degree of spread of the instantaneous light emitted by the stimulable phosphor in the panel, but depends upon the degree of spread of the stimulating rays in the panel. The reason for this will be explained as follows. That is, in the above-mentioned method for recording and reproducing a radiation image, the radiation image stored in the panel is taken out of the panel sequencially as mentioned above. Therefore, all of the light emission caused by the stimulating rays at a certain period (ti) is desirably detected as the output of a certain picture element (xi, yi) on the panel which is exposed to the stimulating rays during the period (ti). Where the stimulating rays spread in the panel due to scattering or the like and stimulates the phosphor surrounding the picture element (xi, yi) in addition to the picture element (xi, yi), the output for the area broader than the picture element (xi, yi) is detected as the output of the picture element (xi, yi). Accordingly, if the light emission caused by the stimulating rays during the period (ti) is only the one emitted by the picture element (xi, yi) solely which has been exactly exposed to the stimulating rays during the period (ti), the instantaneously emitted light does not affect the sharpness of the image obtained no matter how the emitted light spreads in the panel.

The radiation image storage panel employed in the above-mentioned method for recording and reproducing a radiation image at least has a fluorescent layer comprising a proper binder and a stimulable phosphor particles dispersed therein. Although the fluorescent layer itself can be a radiation image storage panel when the fluorescent layer is self-supporting, the fluorescent layer is generally provided on a proper substrate to form a radiation image storage panel. Further, a protective layer for physically and chemically protecting the fluorescent layer is usually provided on the exposed surface of the fluorescent layer. In the conventional radiation image storage panel having such a structure, the mean free path of the stimulating rays in the fluorescent layer becomes relatively long due to scattering or the like, and accordingly the stimulating rays broadly spread therein. Therefore, an image of high sharpness cannot be obtained by the conventional radiation image storage panel.

SUMMARY OF THE INVENTION

In view of the above-mentioned defects in the conventional radiation image storage panel, an object of the present invention is to provide a radiation image storage panel which provides a sharp image.

In order to accomplish the above-mentioned object, the inventors investigated to improve the sharpness of the conventional radiation image storage panel. As a result of the investigations, it has been found that by dispersing a proper amount of a white powder in the fluorescent layer, the spread of the stimulating rays in the fluorescent layer can be controlled, and an image having markedly improved sharpness can be obtained.

The radiation image storage panel of the present invention has a fluorescent layer comprising a binder and a stimulable phosphor dispersed therein characterized in that the fluorescent layer further contains a white powder dispersed therein in an amount of 0.01 to 1 parts by weight per one part by weight of the stimulable phosphor.

BRIEF DESCRIPTION OF THE DRAWING

The accompanying single FIGURE schematically shows the method for recording and reproducing a radiation image using the radiation image storage panel of the present invention.

DETAILED DESCRIPTION OF THE INVENTION

As mentioned above, the stimulable phosphor which can be employed in the radiation image storage panel of the present invention is a phosphor which emits instantaneous light when exposed to stimulating rays after exposure to a radiation. From the viewpoint of practical use, the stimulable phosphor should preferably be a phosphor which emits instantaneous light when exposed to stimulating rays having a wavelength ranging from 500 to 800 nm. For example, the stimulable phosphor which can be employed in the radiation image storage panel of the present invention includes (a) SrS:Ce,Sm, SrS:Eu,Sm, La$_2$O$_2$S:Eu,Sm, and (Zn,Cd)S:Mn,X wherein X is halogen, which are described in the above-mentioned U.S. Pat. No. 3,859,527; (b) ZnS:Cu,Pb, BaO.xAl$_2$O$_3$:Eu wherein x is a number satisfying the condition of $0.8 \leq x \leq 10$, and M$^{II}$O.xSiO$_2$:A wherein M$^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, which are described in Japanese Patent Application No. 84,740/1978; (c) $(Ba_{1-x-y},Mg_x,Ca_y)FX:aEu^{2+}$ wherein X is Cl and/or Br, x and y are numbers satisfying the conditions of $0 < x+y \leq 0.6$ and $xy \neq 0$, and a is a number satisfying the condition of $10^{-6} \leq a \leq 5 \times 10^{-2}$, which is described in Japanese Patent Application No. 84,742/1978; (d) LnOX:aA wherein Ln is at least one element selected from the group consisting of La, Y, Gd and Lu, X is Cl and/or Br, A is Ce and/or Tb, and x is a number satisfying the condition of $0 < x < 0.1$, which is described in Japanese Patent Application No. 84,743/1978; (e) $(Ba_{1-x},M^{II}_x)FX:yA$ wherein $M^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, which is described in Japanese Patent Application No. 84,744/1978. However, it is needless to say that the stimulable phosphor which can be employed in the present invention is not limited to the above-mentioned phosphors, and that any phosphor can be employed in the present invention provided that the phosphor emits instantaneous light when exposed to stimulating rays after exposure to a radiation.

In general, there is a tendency that the smaller becomes the mean particle size of the stimulable phosphor employed in a radiation image storage panel, the higher becomes the granularity thereof but the lower becomes the sensitivity thereof. To the contrary, there is a tendency that the larger becomes the mean particle size of the stimulable phosphor employed in the radiation image storage panel, the higher becomes the sensitivity thereof but the lower becomes the granularity thereof. In consideration of these tendencies, the stimulable phosphor employed in the present invention is generally selected from those having a mean particle size ranging from 0.1 to 100μ. The stimulable phosphor having a mean particle size ranging from 1 to 30μ is preferably employed. Further, the amount of the stimulable phosphor employed is properly decided in view of the recording and reproducing performance and economy of the radiation image storage panel. The amount of the stimulable phosphor is generally within the range of 3 to 300 mg per 1 cm² of the radiation image storage panel.

In the radiation image storage panel of the present invention, the white powder dispersed in the fluorescent layer together with the above-mentioned stimulable phosphor has a function to prevent the lowering of the sharpness caused by the spread of the stimulating rays in the fluorescent layer. That is, the stimulating rays which spread in the fluorescent layer also stimulates the phosphor existing outside the portion exposed to the stimulating rays. However, when the white powder is dispersed in the fluorescent layer, the light scattering effect of the fluorescent layer markedly rises and the mean free path of the stimulating rays is shortened, and therefore, the stimulating rays intensely scatter in a narrow area and go out of the surface of the fluorescent layer. Thus, the spread of the stimulating rays in the fluorescent layer is controlled within a small region.

In the conventional radiography, it is well known to disperse a white powder in the fluorescent layer of an intensifying screen. However, quite unlike the present invention, a white powder is dispersed in the fluorescent layer of an intensifying screen to efficiently utilize the light (instantaneous light) emitted by a phosphor, thereby improving the speed of the intensifying screen. In contrast to this, in the present invention, a white powder is dispersed in the fluorescent layer of a radiation image storage panel to control the spread of stimulating rays in the fluorescent layer, thereby improving the sharpness of the image obtained.

The white powder employed in the present invention should be recognized to be white by the naked eyes and comprise particles having a large refractive index (preferably not less than 1.7). The white powder should preferably have a mean particle size ranging from 0.05 to 50μ, and more preferably has a mean particle size ranging from 0.1 to 10μ. When the mean particle size of the white powder is less than 0.05μ, the light scattering effect of the white powder tends to fall. On the other hand, when the mean particle size of the white powder is more than 50μ, the granularity of the radiation image storage panel obtained tends to fall. The white powder used should preferably have a mean particle size of less than that of the stimulable phosphor to be used, and should more preferably have a mean particle size of not more than a half of that of the stimulable phosphor.

Further, the white powder suitable for the present invention can be selected by the following whiteness evaluation test.

60 mg of the stimulable phosphor to be used and 10 mg of a white powder are mixed thoroughly to obtain a mixture. The mixture is charged in a recess of a sample holder having a diameter of 6 mm and a depth of 1 mm. Then, the sample is exposed to X-rays. Thereafter, the sample is scanned with a monochromatic light beam of the wavelength within a range of 500 to 800 nm obtained by a monochrometer, and the number of the photons of the light emitted by the sample is counted. When the number of the photons counted in the sample is not less than 30% of that counted in the same manner in a sample which comprises 70 mg of the same stimulable phosphor only, such a white powder can be practically used in the present invention. Preferably, it is desired to be not less than 50%. In the whiteness evaluation test, the read-out level is desired to be considerably low from the view-point of accuracy in measurement. Particularly, it is desirable that the read-out level is not more than 1/10 of the level of the trap in the phosphor.

The white powder which can be employed in the present invention includes, for example, $TiO_2$, ZnS, $Y_2O_3$, $Ta_2O_5$, $Sb_2O_3$, CaO, BaO, SrO, $Al_2O_3$, MgO, ZnO, $ZrO_2$, $SiO_2$, $In_2O_3$, $GeO_2$, $SnO_2$, $Nb_2O_5$, BeO, and the like.

In the radiation image storage panel of the present invention, the amount of the white powder is limited to the range of 0.01 to 1 part by weight per one part by weight of the stimulable phosphor which constitutes a fluorescent layer together with the white powder. This is because when the amount thereof is less than 0.01 parts by weight, the sharpness of the panel is not improved, and on the other hand, when the amount thereof is more than 1 part by weight, the thickness of the fluorescent layer becomes large per unit weight of the stimulable phosphor, and accordingly the sharpness of the panel is lowered. The amount of the white powder is preferably within the range of 0.03 to 0.5 parts by weight.

The radiation image storage panel of the present invention at least has a fluorescent layer containing the above-mentioned stimulable phosphor and white powder. The fluorescent layer is formed by dispersing the stimulable phosphor and 0.01 to 1 parts by weight of the white powder per one part by weight of the stimulable phosphor in a proper binder to prepare a coating dispersion, and then applying the coating dispersion by the conventional coating method to form an uniform layer on a substrate. As the binder, for example, is used a binder which is usually used in forming a layer such as gum arabic, protein such as gelatin, polysaccharide such as dextran, polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and the like. The binder is generally used in an amount of 0.01 to 1 parts by weight per one part by weight of the stimulable phosphor. However, from the viewpoint of the sensitivity and the sharpness of the panel obtained, the amount of the binder is preferably small. Accordingly, in consideration of both the sensitivity and the sharpness of the panel and easiness of application of the coating dispersion, the binder is preferably used in an amount of 0.03 to 0.2 parts by weight per one part by weight of the stimulable phosphor. The thickness of the fluorescent layer is generally within the range of $10\mu$ to 1 mm.

Although the fluorescent layer itself can be a radiation image storage panel of the present invention when the fluorescent layer is self-supporting, the fluorescent layer is generally provided on a proper substrate to form the radiation image storage panel of the present invention. As the substrate, various materials such as polymer material, glass, wool, cotton, paper, metal, or the like can be used. From the viewpoint of handling the panel as an information recording medium, the substrate should preferably be processed into a sheet or a roll having flexibility. In this connection, a plastic film such as a cellulose acetate film, a polyester film, a polyethylene terephthalate film, a polyamide film, a polyimide film, a triacetate film, a polycarbonate film, and the like; ordinary paper; and processed paper such as photographic paper, printing paper such as coated paper and art paper, baryta paper, resin-coated paper, sized paper described in Belgian Pat. No. 784,615 which is sized with polysaccharide, pigment-containing paper which contains a pigment such as titanium dioxide, sized paper which is sized with polyvinyl alcohol, and the like are preferable as the substrate. The substrate may have a primer layer on one surface thereof (the surface on which the fluorescent layer is provided) for the purpose of holding the fluorescent layer tightly. In providing a fluorescent layer on the substrate, a coating dispersion comprising a stimulable phosphor and a white powder dispersed in a binder may be directly applied to the substrate to form a fluorescent layer. Alternatively, a fluorescent layer formed beforehand may be bonded to the substrate. Where the substrate used is permeable to stimulating rays, the radiation image storage panel can be exposed to a stimulating rays from the substrate side.

Further, in the radiation image storage panel of the present invention, a protective layer for physically and chemically protecting the surface of the fluorescent layer is generally provided on the exposed surface of the fluorescent layer (on the opposite side of the substrate). The protective layer may be provided on the fluorescent layer by directly applying thereto a coating dispersion to form the protective film thereon, or may be provided thereon by bonding thereto the protective layer or film formed beforehand. As the material of the protective layer, the conventional material for a protective layer such as nitrocellulose, ethylcellulose, cellulose acetate, polyester, polyethylene terephthalate, and the like can be used. The protective layer should be permeable to the instantaneous light emitted by the stimulable phosphor contained in the fluorescent layer. Further, when the radiation image storage panel is exposed to stimulating rays from the protective layer side (generally, the panel is exposed to stimulating rays from the protective layer side), the protective layer should be permeable to the stimulating rays.

The radiation image storage panel of the present invention provides an image of high sharpness when used in the method for recording and reproducing a radiation image schematically shown in the accompanying drawing. In the method, a radiation source 11, an object 12, a radiation image storage panel 13 of the present invention having a fluorescent layer containing a white powder together with a stimulable phosphor, a light source 14 emitting stimulating rays which stimulates the fluorescent layer of the panel 13 to release the radiation energy stored therein as instantaneous fluorescent light, a photosensor 15 for detecting the fluorescent light emitted by the panel 13, a reproduction device 16 for converting an electrical signal obtained by the photosensor 15 to an image corresponding to the radiation image, a display device 17 for displaying the image, and a filter 18 for cutting the stimulation light emitted by the light source 14 and reflected by the panel 13 and for transmitting only the fluorescent light emitted by the panel 13 are arranged as shown in the drawing. In the method shown in the drawing, the photosensor 15 is used as a detector for detecting the instantaneous fluorescent light emitted by the panel 13, and reproduction of a radiation image is performed by means of the photosensor 15, the reproduction device 16 and the display device 17. However, means for reproducing a radiation image is not limited thereto.

As shown in the drawing, the object 12 is positioned between the radiation source 11 and the radiation image storage panel 13 of the present invention. When the object 12 is exposed to a radiation from the source 11, the radiation passes through the object 12. The intensity of the radiation which has passed through the object 12 represents the transmittance of the object 12. Therefore, an image which represents the pattern of transmittance of the object 12 is obtained by means of the radiation impinging upon the radiation image storage panel 13. The radiation in the form of the image representing the pattern of transmittance of the object 12 is absorbed by the fluorescent layer of the panel 13, and electrons or holes are generated in the fluorescent layer. The amount of the electrons or holes generated are in proportion to the amount of the radiation energy absorbed. The electrons or holes are stored in the trap level of the stimulable phosphor, and thus, the radiation image is stored in the radiation image storage panel 13.

Then, the radiation stored in the panel 13 is visualized by stimulation with the stimulating rays emitted by the light source 14. That is, the fluorescent layer of the panel 13 is scanned with the stimulating rays emitted by the light source 14, whereby the electrons or holes stored in the trap level of the stimulable phosphor are expelled therefrom, and the radiation image stored in the panel 13 is released as instantaneous fluorescent light. The panel 13 contains the white powder in the fluorescent layer thereof, and therefore, when the fluorescent layer is scanned with the stimulating rays, the spread of the stimulating rays in the fluorescent layer is controlled by the white powder. The luminance of the fluorescent light emitted by the panel 13 is in proportion to the number of the electrons or holes stored in the fluorescent layer of the panel 13, that is, the amount of the radiation energy absorbed thereby. The fluorescent layer (light signal) is detected and converted to an electrical signal sequencially by the photosensor 15 such as a photomultiplier. The electrical signal obtained is converted to an image corresponding to the radiation image by the reproducting device 16, and the image is displayed by the display device 17. Thus, the radiation image is reproduced.

As mentioned above, in the radiation image storage panel of the present invention, the spread of the stimulating rays in the fluorescent layer is controlled by the white powder dispersed therein. Therefore, the sharpness of the image reproduced by the reproducing device 16 and of the image displayed by the display device 17 is markedly improved.

The present invention will hereinbelow be described referring to several examples.

EXAMPLE 1

8 parts by weight of $Ba_{0.9}Mg_{0.1}FCl:Ce^{3+}(10^{-4})$ (stimulable phosphor), one part by weight of alumina powder having a mean particle size of $1\mu$ (white powder) and one part by weight of nitrocellulose (binder) were mixed by use of a solvent (a mixture of acetone, ethyl acetate and butyl acetate) to prepare a coating dispersion having a viscosity of about 50 centistokes. Then, the coating dispersion was uniformly applied to a polyethylene terephthalate film (substrate) positioned horizontally and dried naturaly by allowing it to stand for a day to form a fluorescent layer of a thickness of about $300\mu$. The radiation image storage panel thus obtained is referred to as "Panel A".

On the other hand, a radiation image storage panel (Panel B) was manufactured for comparison with the Panel A in the same manner as mentioned above except for not using the alumina powder.

Then, Panel A and Panel B were respectively exposed to X-rays of 80 KVp, and thereafter, the panels were respectively scanned with a He-Ne laser beam (633 nm). The instantaneous light emitted by the fluorescent layer of the panels was detected and converted to an electrical signal by a photosensor (a photomultiplier having a spectral sensitivity of type S-5). The electrical signal obtained was converted to an image by the reproduction device, and the image was displayed by the displaying device. The modulation transfer function (MTF) was obtained for both the Panel A and Panel B. The results are shown in Table 1 below. It would be appreciated that the MTF of both the panels and the relationship therebetween do not depend upon the reproduction device or the displaying device used.

TABLE 1

| Panel | White Powder | \multicolumn{8}{c}{Spatial Frequency (cycle/mm)} |
| --- | --- | --- | --- | --- | --- | --- | --- | --- | --- |
|  |  | 0 | 0.5 | 1 | 1.5 | 2 | 2.5 | 3 | 4 |
| A | Alumina | 100(%) | 78 | 57 | 46 | 26 | 16 | 12 | 6 |
| B | Non | 100(%) | 70 | 45 | 38 | 15 | 9 | 5 | 2 |

EXAMPLE 2

A radiation image storage panel was manufactured in the same manner as mentioned in Example 1 except for using $BaFBr:Eu^{2+}(10^{-4})$ and zinc sulfide powder having a mean particle size of $1\mu$ instead of the $Ba_{0.9}Mg_{0.1}FCl:Ce^{3+}(10^{-4})$ and the alumina powder, respectively. The radiation image storage panel thus obtained is referred to as "Panel C".

On the other hand, another radiation image storage panel (Panel D) was manufactured for comparison in the same manner as mentioned above except for not using the zinc sulfide powder.

Then, the MTF of both the Panel C and Panel D were measured in the same manner as mentioned in Example 1. The results are shown in Table 2 below.

TABLE 2

| Panel | White Powder | \multicolumn{8}{c}{Spatial Frequency (cycle/mm)} |
| --- | --- | --- | --- | --- | --- | --- | --- | --- | --- |
|  |  | 0 | 0.5 | 1 | 1.5 | 2 | 2.5 | 3 | 4 |
| C | Zinc Sulfide | 100(%) | 83 | 65 | 56 | 32 | 22 | 15 | 10 |
| C | Non | 100(%) | 75 | 52 | 43 | 18 | 12 | 7 | 3 |

As is clear from Tables 1 and 2 above, the radiation image storage panel of the present invention in which the white powder is contained in the fluorescent layer thereof provides an image of higher sharpness than the conventional radiation image storage panel in which the white powder is not used.

We claim:

1. In a radiation image storage panel, which is used in a process for recording and reproducing a radiation image which consists essentially of steps of (1) exposing the panel to a radiation passing through an object to store a radiation image therein, (2) scanning said panel with a stimulating ray having a wavelength ranging from 500 nm to 800 nm to release the energy of the radiation stored therein as instantaneous fluorescent light, and (3) detecting said fluorescent light, having a fluorescent layer comprising a binder and a stimulable phosphor which emits instantaneous light when exposed to the stimulating ray after exposure to a radiation dispersed in said binder, the improvement wherein said fluorescent layer contains a white powder selected from the groups consisting of $TiO_2$, ZnS, $Y_2O_3$, $Ta_2O_5$, $Sb_2O_3$, CaO, BaO, SrO, $Al_2O_3$, MgO, ZnO, $ZrO_2$, $SiO_2$, $In_2O_3$, $GeO_2$, $SnO_2$, $Nb_2O_5$ and BeO and dispersed therein in an amount of 0.01 to 1 parts by weight per one part by weight of said stimulable phosphor and where said white powder does not emit light by scanning of said stimulation ray.

2. A radiation image storage panel as defined in claim 1 wherein the amount of said white powder is within the range of 0.03 to 0.5 parts by weight per one part by weight of said stimulable phosphor.

3. A radiation image storage panel as defined in claim 1 wherein said fluorescent layer is self-supporting and said radiation image storage panel consists solely thereof.

4. A radiation image storage panel as defined in claim 1 wherein said radiation image storage panel comprises a substrate and said fluorescent layer provided thereon.

5. A radiation image storage panel as defined in claim 1 wherein said radiation image storage panel comprises a substrate, said fluorescent layer disposed thereon, and a protective layer disposed further thereon.

6. A radiation image storage panel as defined in claim 1, wherein said white powder has a refractive index of not less than 1.7.

7. A radiation image storage panel as defined in claim 6, wherein said mean particle size ranges from 0.1 to 10 micron.

8. A radiation image storage panel as defined in claim 1, wherein said white powder has a mean particle size ranging from 0.05 to 5 micron.

9. A radiation image storage panel as defined in claims 6 or 8, wherein said mean particle size of the white powder is less than that of the stimulable phosphor.

10. A radiation image storage panel as defined in claims 6 or 8, wherein said mean particle size of the white powder is not more than a half of that of the stimulable phosphor.

11. A radiation image storage panel as defined in claim 1, wherein said stimulable phosphor is selected from a group consisting of SrS:Ce,Sm, SrS:Eu,Sm, $La_2O_2S$:Eu,Sm, and (Zn,Cd)S:Mn,X wherein X is halogen; ZnS:Cu,Pb, BaO.x$Al_2O_3$:Eu wherein x is a number satisfying the condition of $0.8 \leq x \leq 10$, and $M^{II}$O.$xSiO_2$:A wherein $M^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$; LnOX:aA wherein Ln is at least one element selected from the group consisting of La, Y, Gd and Lu, X is Cl and/or Br, A is Ce and/or Tb, and x is a number satisfying the condition of $0 < x < 0.1$; $(Ba_{1-x},M^{II}_x)$FX:yA wherein $M^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively.

12. A radiation image storage panel as defined in claim 11 wherein said stimulable phosphor is selected from the group consisting of LnOX:aA wherein Ln is at least one element selected from the group consisting of La, Y, Gd and Lu, X is Cl and/or Br, A is Ce and/or Tb, and x is a number satisfying the condition of $0 < x < 0.1$; $(Ba_{1-x},M^{II}_x)$FX:yA wherein $M^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively.

13. In a radiation image storage panel, which is used in a process for recording and reproducing a radiation image which consists essentially of steps of (1) exposing the panel to a radiation passing through an object to store a radiation image therein, (2) scanning said panel with a stimulating ray having a wavelength ranging from 500 nm to 800 nm to release the energy of the radiation stored therein as instantaneous fluorescent light, and (3) detecting said fluorescent light, having a fluorescent layer comprising a binder and a stimulable phosphor which emits instantaneous light when exposed to the stimulating ray after exposure to a radiation dispersed in said binder wherein said stimulable phosphor is a phosphor represented by $(Ba_{1-x},M^{II}_x)$FX:yA wherein $M^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, the improvement wherein said fluorescent layer contains a white powder selected from the group consisting of $TiO_2$, ZnS, $Y_2O_3$, $Ta_2O_5$, $Sb_2O_3$, CaO, BaO, SrO, $Al_2O_3$, MgO, ZnO, $ZrO_2$, $SiO_2$, $In_2O_3$, $GeO_2$, $SnO_2$, $Nb_2O_5$, and BeO, and dispersed therein in an amount of 0.01 to 1 parts by weight per one part by weight of said stimulable phosphor and where said white powder does not emit light by scanning of said stimulation ray.

* * * * *